United States Patent
Guercioni

(10) Patent No.: US 8,661,868 B2
(45) Date of Patent: Mar. 4, 2014

(54) APPARATUS FOR TWISTING ELECTRICAL BAR CONDUCTORS, IN PARTICULAR FOR BAR WINDINGS OF ELECTRICAL MACHINES, WITH CONDUCTOR'S CLAMPING SYSTEM

(75) Inventor: Sante Guercioni, Teramo (IT)

(73) Assignee: Tecnomatic S.p.A., Teramo (IT)

( * ) Notice: Subject to any disclaimer, the term of this patent is extended or adjusted under 35 U.S.C. 154(b) by 0 days.

(21) Appl. No.: 13/387,733

(22) PCT Filed: Jul. 28, 2010

(86) PCT No.: PCT/IT2010/000338
§ 371 (c)(1),
(2), (4) Date: Jan. 28, 2012

(87) PCT Pub. No.: WO2012/014233
PCT Pub. Date: Feb. 2, 2012

(65) Prior Publication Data
US 2013/0118222 A1 May 16, 2013

(51) Int. Cl.
*B21D 11/14* (2006.01)
(52) U.S. Cl.
USPC ............................................. 72/299; 29/598
(58) Field of Classification Search
USPC ........... 72/295, 298, 299, 300, 301, 311, 316; 29/598
See application file for complete search history.

(56) References Cited

U.S. PATENT DOCUMENTS

| 2,476,744 | A | 7/1945 | Leece |
| 2,476,745 | A | 7/1945 | Leece |
| 7,480,987 | B1 | 1/2009 | Guercioni |
| 7,721,413 | B2 | 5/2010 | Guercioni |
| 2007/0180681 | A1 * | 8/2007 | Kato et al. ...................... 29/596 |
| 2009/0178270 | A1 | 7/2009 | Guercioni |
| 2009/0265909 | A1 | 10/2009 | Guercioni |

FOREIGN PATENT DOCUMENTS

| WO | 2011128919 | 10/2011 |
| WO | 2011132207 | 10/2011 |
| WO | 2011135596 | 11/2011 |

* cited by examiner

*Primary Examiner* — Debra Sullivan
(74) *Attorney, Agent, or Firm* — Tarter Krinsky & Drogin LLP; Rachel J. Lin

(57) ABSTRACT

A twisting apparatus (30) of preformed bar conductors (25) for bar windings of electric machines comprising a twisting device (50) having at least a first (51) and a second body (52) coaxial to one another and extending around a twisting axis (Zt-Zt) defining an axial direction and respectively comprising a first (A1) and a second (A2) circular array of pockets. The twisting device (50) comprises a system for clamping bar conductors comprising at least one sliding clamping element (72, 92) movable in a radial direction with respect to the axial direction (Zt-Zt) to take up an advanced operative position in which it has an end portion (73, 74, 93, 94) that projects inside an associated pocket and a set-back operating position.

14 Claims, 12 Drawing Sheets

US 8,661,868 B2

APPARATUS FOR TWISTING ELECTRICAL BAR CONDUCTORS, IN PARTICULAR FOR BAR WINDINGS OF ELECTRICAL MACHINES, WITH CONDUCTOR'S CLAMPING SYSTEM

CROSS REFERENCE TO RELATED APPLICATIONS

This application is based on International Application No. PCT/IT2010/000338, filed on Jul. 28, 2010, the contents of which are incorporated herein by reference.

FIELD OF THE INVENTION

The present description concerns an apparatus for twisting electrical bar conductors, in particular for bar windings of electrical machines.

BACKGROUND OF THE INVENTION

Components of electric machines, such as stators and rotors, are known that comprise electric bar conductors bent and variously connected together so as to make so-called bar windings.

In particular, the state of the art includes bar windings made through electric bar conductors having an essentially rectangular cross section, where by rectangular we mean both the square section and the "flat" section with which a rectangular-shaped section in which one of the two sides of the section is shorter than the other is generally indicated.

The aforementioned bar conductors are preformed usually through bending in a 'U' or 'P' shape from straight bar conductors. U.S. Pat. No. 7,480,987 describes an example of a method for preforming bar conductors (known in such a document as "hairpin conductors"). The preforming is such as to modify the shape of the straight conductors so that they can be suitably inserted in suitable radially aligned pockets made in a twisting device suitable for deforming the aforementioned preformed conductors after insertion. In practice, the twisting device is used essentially to "spread apart" the legs of the "U" or "P" shape to ensure that two legs of the same conductor, after having extracted it from the twisting device, can subsequently be inserted into the slots of a stator or rotor core radially offset from one another by a predetermined pitch.

The United States patent application published with number US 2009/0178270 describes a method for twisting preformed bar conductors after their insertion in the pockets of a twisting device.

In order to precisely bend the bar conductors that form a bar winding, there is a great need to stably clamp in position at least some of the aforementioned bar conductors after their insertion in the pockets of the twisting device, for example during the twisting operation. In particular, without for this reason introducing any limitation, there is an especially great need to stably clamp in position at least the bar conductors provided to make the so-called special elements after their insertion in the pockets of the twisting device, for example before the start of the twisting operation and for the entire duration of such an operation.

SUMMARY OF THE INVENTION

The purpose of the present description is to provide a twisting apparatus that is such as to satisfy the requirement outlined above with reference to the prior art.

Such a purpose is accomplished through a twisting apparatus as defined in general in claim 1 and in the claims dependent upon it in particular embodiments.

A further purpose of the present description is to provide a twisting method as defined in the attached claim 13.

Further characteristics and advantages of the present invention will become clearer from the following description of its preferred and not limiting embodiments, in which:

DETAILED DESCRIPTION

Figure 1:
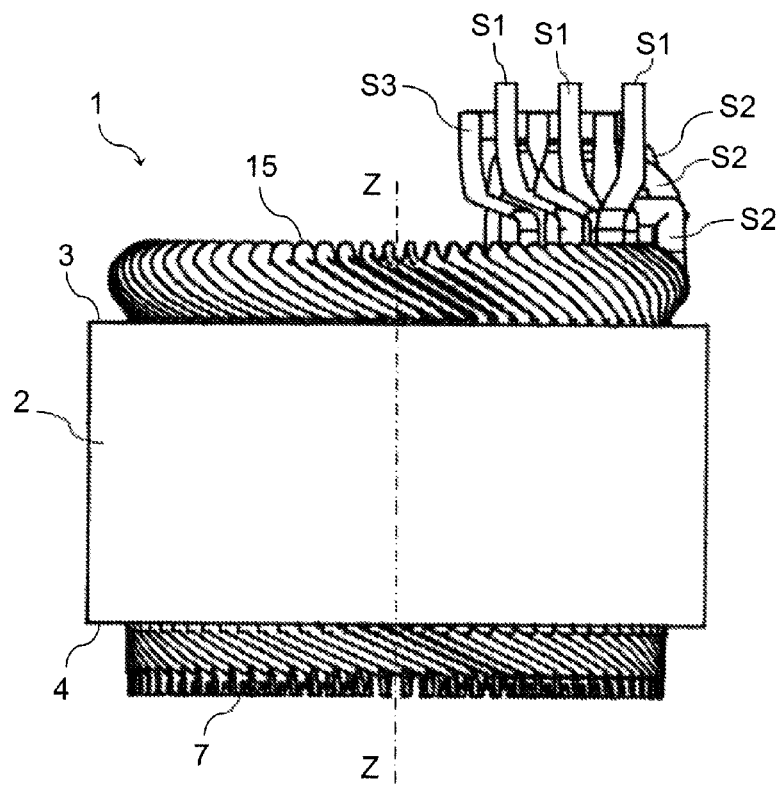
FIG. 1 schematically shows a side view of an embodiment of a stator for an electric machine, comprising a stator core and a stator bar winding.
Figure 2:
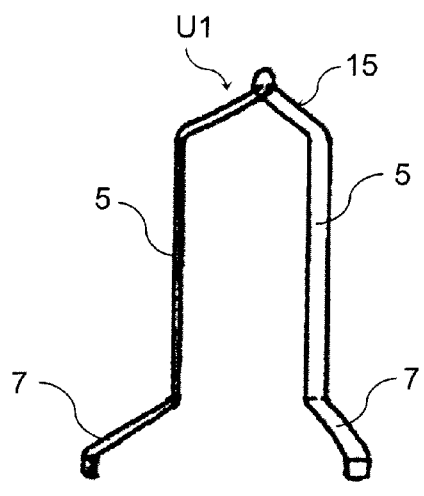
FIG. 2 shows a perspective view of a first type of basic conductor.
Figure 3:
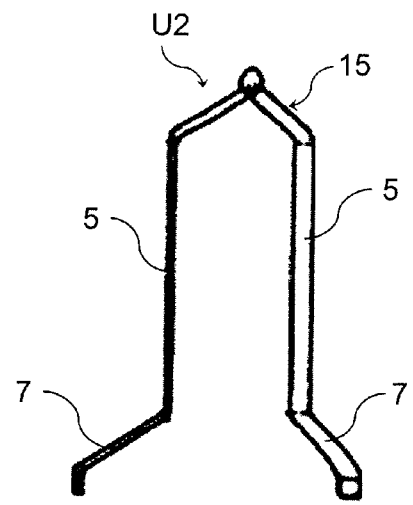
FIG. 3 shows a perspective view of a second type of basic conductor.
Figure 4:
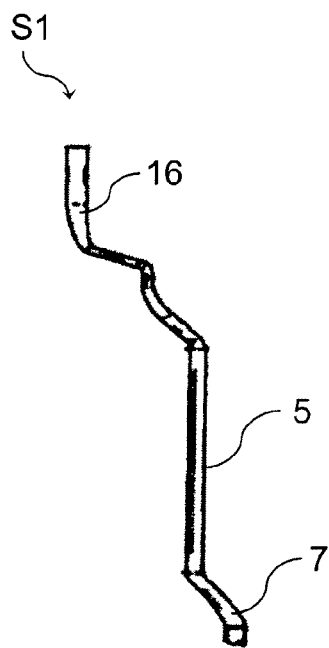
FIG. 4 shows a perspective view of a bar conductor suitable for carrying out the function of a phase terminal.
Figure 5:
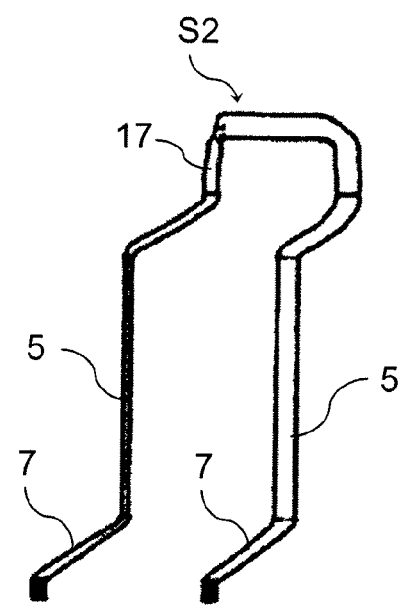
FIG. 5 shows a perspective view of a bar conductor suitable for carrying out the function of a jumper.
Figure 6:
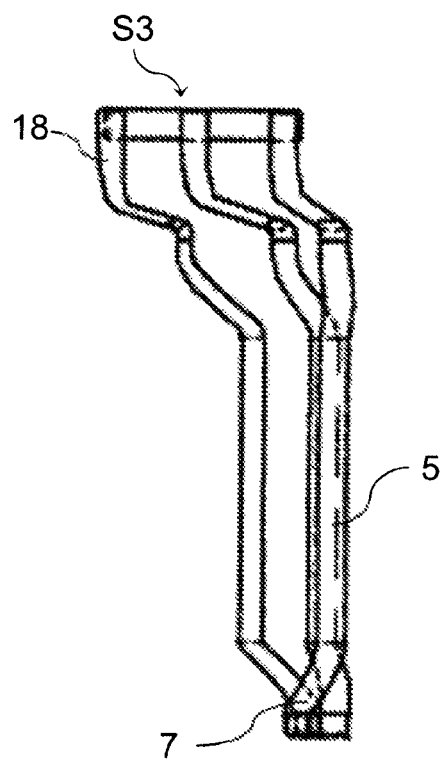
FIG. 6 shows a perspective view of a bar conductor suitable for carrying out the function of neutral or star point.

In the figures, elements that are the same or similar are indicated with the same reference numerals.

For the purposes of the present description by "flat" or "square" bar conductor we mean a bar conductor having four substantially flat sides, each joined at adjacent sides, typically by a rounded edge.

Therefore, the words "flat" or "square" or equivalent words used to describe the cross section of a bar conductor are used in the general sense and must not be interpreted to exclude the fact that such bar conductors have significantly rounded edges that join the substantially flat sides. The expression "flat conductor" should be taken in the sense that the conductor has two opposite sides the distance between which is greater than the distance between the remaining two opposite sides. For the purposes of the present description the expression "rectangular conductor" should be taken as a generalisation of flat conductor and of square conductor, the square conductor being a special case of a rectangular conductor, in which the four sides are of equal dimensions.

With reference to the attached figures, reference numeral 1 generically indicates a stator comprising a stator core 2. For example, the stator 1 is the stator of an electric machine like for example an electric motor, for example for an electric or hybrid traction vehicle.

It is clear that such a stator can also be used in an electric machine used as a generator or used both to carry out the function of a motor and the function of a generator alternately. In the attached figures just the stator of such an electric machine has been represented since it is considered that the remaining parts of an electric machine or in general of an electric or hybrid traction vehicle are widely known by the man skilled in the art.

For the sake of simplicity and brevity of description, in this document a rotor will also not be described in detail since it is considered that a man skilled in the art, who knows the structure of a rotor very well, can without any difficulty foresee to apply the teachings of the present description to a rotor.

In a per sé known way, the stator core 2 comprises a lamellar tubular main body, for example made from magnetic material, which extends axially (axis Z-Z) between two opposite faces 3,4, respectively called insertion face 3 and welding face 4.

The main body of the stator core 2 comprises a plurality of slots 8 that extend axially in the thickness of the main body and that are crossed by bar conductors U1, U2, S1, S2, S3 that as a whole form at least one stator bar winding. In accordance with an embodiment, the bar conductors U1, U2, S1, S2, S3 are surface coated with an insulating layer of insulating material, like for example an insulating enamel.

In accordance with an embodiment, the aforementioned bar conductors U1, U2, S1, S2, S3 are conductors made from copper and are flat rectangular conductors, since they have a pair of opposite faces that are farther apart than the other two opposite faces.

In accordance with an embodiment, the bar conductors U1, U2, S1, S2, S3 comprise a first plurality of basic conductors U1, U2, and a second plurality of special conductors S1-S3 that comprise for example terminals S1, jumpers S2 or the neutral S3. As known, these bar conductors S1-S3 represent so-called special elements provided to complete the winding. In the present description, the expression "basic conductors" is used exclusively to identify conductors that are not special elements of the type described above, i.e. that are not specifically provided to functionally complete the winding.

The basic bar conductors U1, U2 of the first plurality have a bent portion 15, or connection portion, which projects from the insertion face 3 of the stator core 2 and two legs 5 the free end portions 7 of which project from the other face 4 of the stator core 2, i.e. from the welding face 4. The bent portion 15 is also known in the field as "head portion". In accordance with a non-limiting embodiment between the basic conductors there is a first type of conductors U1 and a second type of conductors U2 that differ from one another mainly for the distance between the legs 5. As known to a man skilled in the art this difference also involves a certain difference in the overall length of the conductor.

Figure 9:
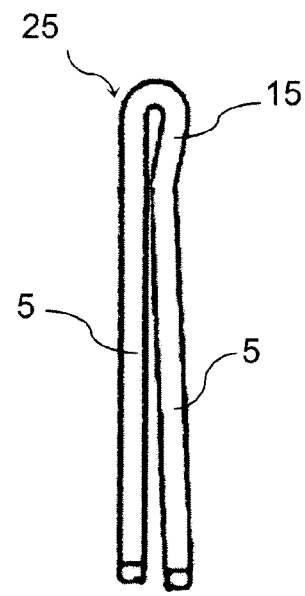
FIG. 9 represents a P-shaped preformed bar conductor.

The basic bar conductors U1, U2 are obtained by spreading apart the legs 5 of a preformed bar conductor shaped like a "U", or like a "P" as for example represented in FIG. 9, by a predetermined amount or pitch. Henceforth for the sake of simplicity of description and without for this reason introducing any limitation, the preformed bar conductors shaped like a U or P will be indicated in general as "preformed U-shaped conductors", by U meaning an approximation of the P of FIG. 9.

The operation of spreading apart the legs of the preformed U-shaped conductors is generally called twisting, and more specifically twisting of the head portions and the predetermined amount, or pitch, is called "twisting pitch", and more specifically twisting pitch of the head portions. The latter is measured in number of slots 8. For example, the basic bar conductors of the first type U1 are obtained by twisting of the preformed U-shaped conductor of the same or similar type as the one represented in FIG. 9 according to a twisting pitch equal to nine slots, whereas the basic bar conductors of the second type U2 are obtained by twisting of the preformed U-shaped conductor of the same or similar type as the one represented in FIG. 9 according to a twisting pitch equal to eight slots. It is clear that the aforementioned twisting operation of the head portions to spread apart the legs 5 of the same preformed U-shaped conductor must, after having inserted said preformed conductors 25 subjected to twisting into the stator core, be followed by a twisting of the end portions 7, to allow the welding of such portions required to make the winding. It is also clear that to ensure that the basic conductors U1, U2, after twisting, have connection portions 15 arranged at the same height, said basic conductors must be obtained from preformed U-shaped conductors of different length.

The special conductors S1-S3 also comprise at least one leg 5, a bent end portion 7 projecting from the welding face 4 and variously shaped opposite end portions 16, 17, 18 projecting from the insertion face 3. The shape of the special conductors S1-S3 is also modified in the twisting operation of the head portions. Henceforth for the sake of simplicity we shall refer to the twisting operation of the head portions using the more concise expression "twisting operation".

Figure 7:
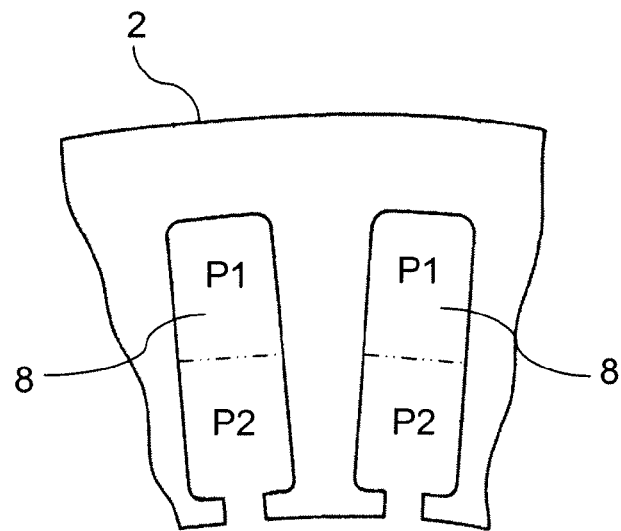
FIG. 7 schematically shows a view from above of a portion of the stator core, in which it is possible to see two slots intended to be filled with respective preformed insulating sheets and bar conductors.
Figure 8:
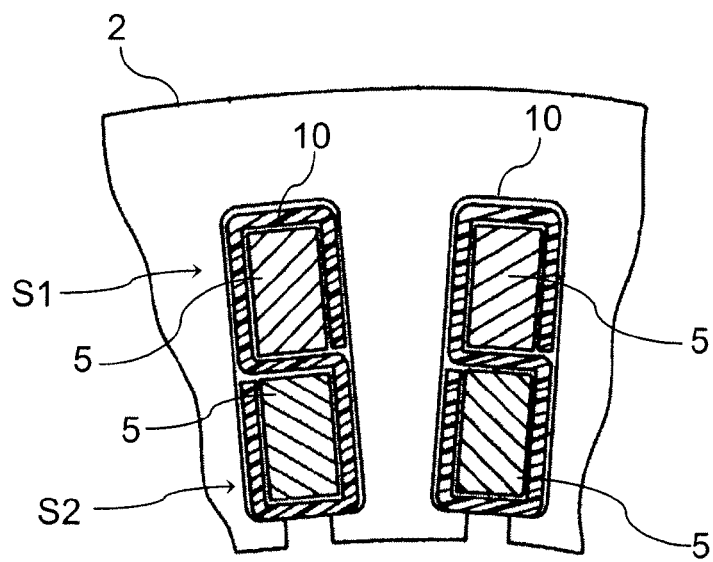
FIG. 8 schematically shows a view from above of a portion of the stator core, in which it is possible to see two slots that house respective insulating sheets and bar conductors.

With reference to FIGS. 7 and 8, each slot 8 of the stator core 2 is crossed by at least two legs of the aforementioned bar conductors U1, U2, S1, S2, S3, and houses at least one sheet 10, or casing 10, made from insulating material.

In accordance with an embodiment, as shown in FIG. 7, in the case in which the bar conductors are flat, the two bar conductors inside the same slot are aligned along their respective short side.

It should be observed that in the particular example represented, each slot 8 has a first and a second insertion position P1, P2 radially aligned with one another. When the legs 5 of the bar conductors U1, U2, S1, S2, S3 are inserted inside the slots 8, two circular and concentric arrays of legs 5 are therefore defined in the stator 1. Clearly, in the case in which each slot 8 has four insertion positions, four circular and concentric arrays of legs 5 will be defined and so on.

Figure 10:
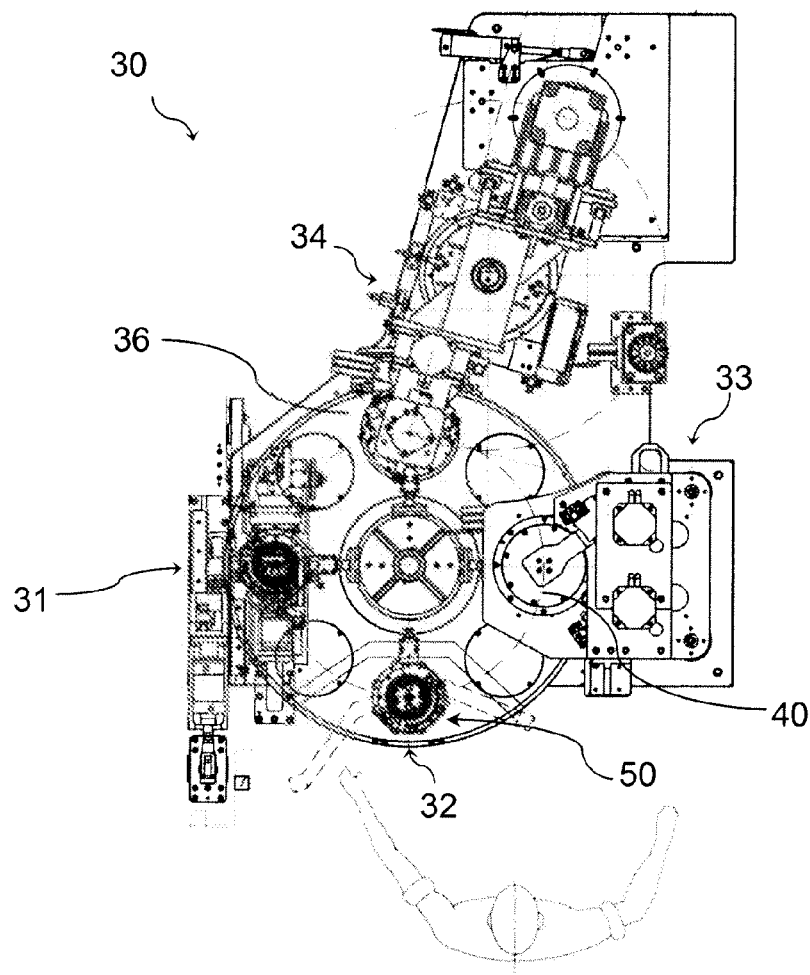
FIG. 10 shows a view from above of a twisting apparatus.

FIG. 10 shows an example of a twisting apparatus 30, comprising a rotary table 36 suitable for moving a twisting device 50 between different work stations, and in particular between a loading station 31 of preformed basic conductors U1, U2, a subsequent loading station 32 of the special conductors S1-S3, a twisting station 33 and a station 34 for extracting the conductors from the twisting device 50 and for loading into a stator core 2. The twisting apparatus 30 at the twisting station 33 comprises a containment head 40 suitable for cooperating with the twisting device 50.

Figure 11:
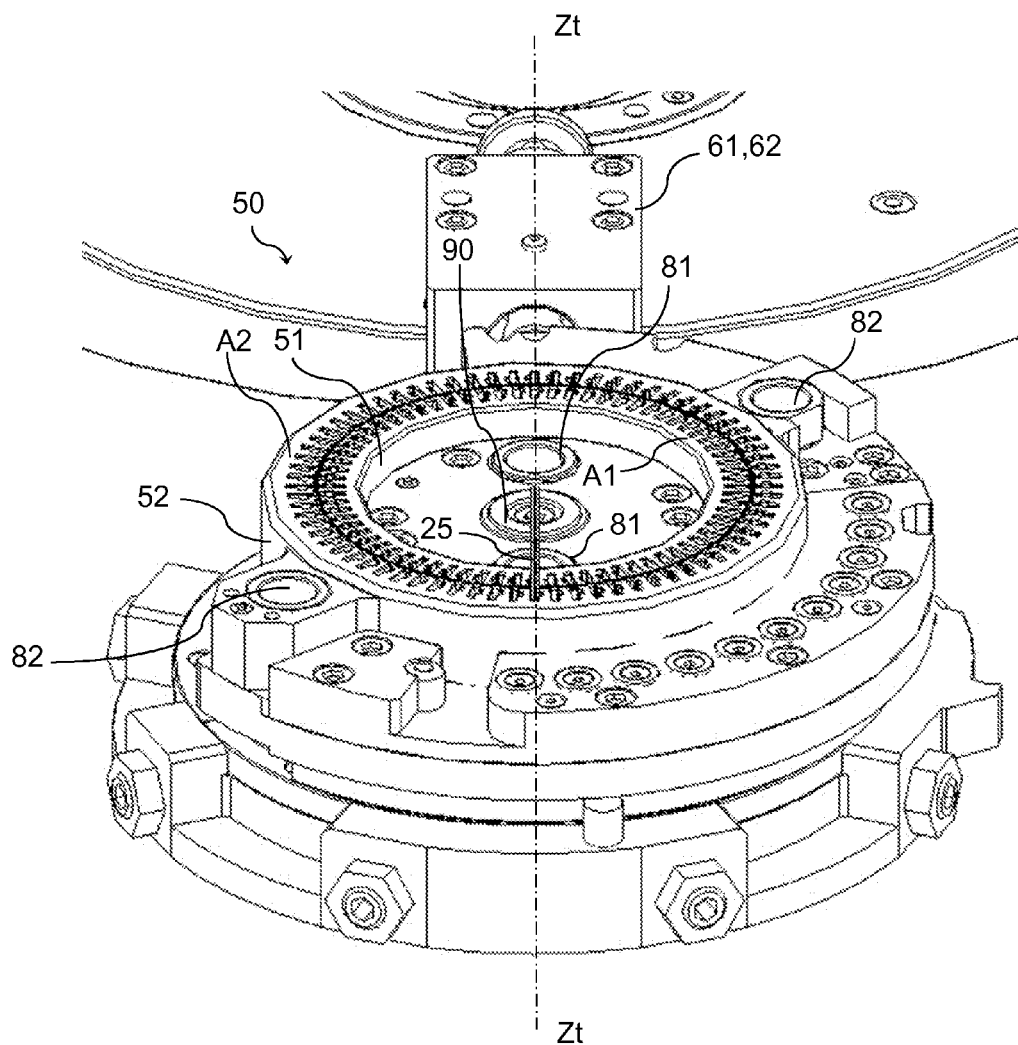
FIG. 11 shows a perspective view of an embodiment of a twisting device comprised in the twisting apparatus of FIG. 10.
Figure 12:
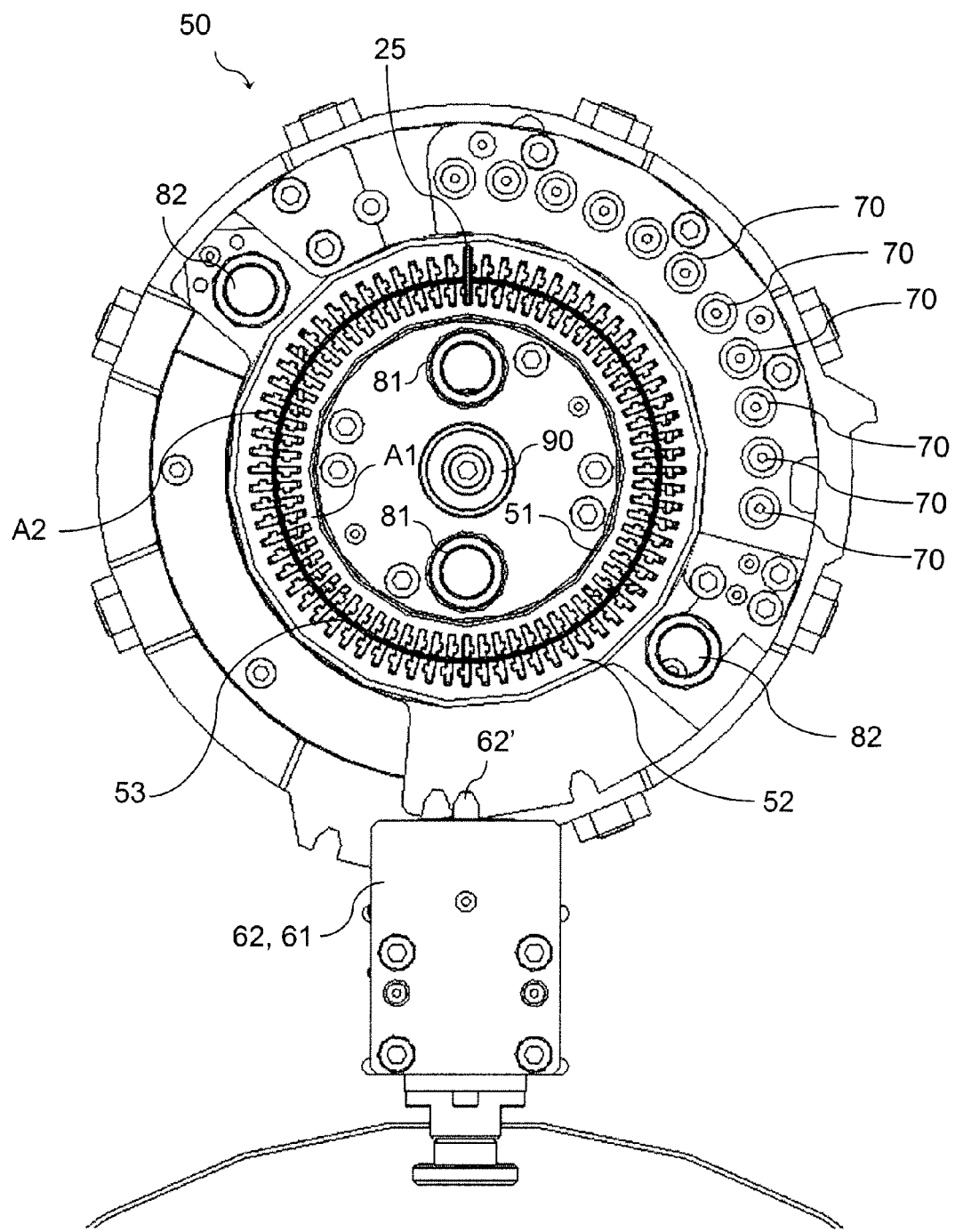
FIG. 12 shows a view from above of the twisting device of FIG. 11.

FIGS. 11 and 12 represent an embodiment of a twisting device 50. The twisting device 50 comprises at least a first 51 and a second body 52 coaxial to one another and extending around a twisting axis Zt-Zt, respectively comprising a first A1 and a second A2 circular array of pockets centered around such an axis Zt-Zt. In the particular example indicated, without for this reason introducing any limitation, each circular array A1, A2 comprises seventy-two pockets. It should be observed that in the case in which the slots of the stator have more than two insertion positions P1, P2, the twisting device 50 will comprise more than two arrays of pockets. Henceforth we shall refer to the first and to the second body respectively with the expressions inner body 51 and outer body 52.

The inner and outer bodies 51, 52 are able to rotate with respect to one another around the twisting axis Zt-Zt to take up at least one insertion (or conductor loading) configuration, in which respective pockets of the first and of the second circular array A1, A2 are radially aligned with one another. By radial direction we mean a direction perpendicular to and passing through the twisting axis Zt-Zt. In the aforementioned insertion configuration, one or more preformed U-shaped conductors 25 can be inserted into the pockets so that two legs 5 of the aforementioned preformed U-shaped conductors are inserted into a pair of adjacent and radially aligned pockets 8 of the first A1 and of the second A2 circular array.

In accordance with an embodiment the loading of the preformed U-shaped bar conductors 25 inside the twisting device 50 can, for example and without for this reason introducing any limitation, be made in the loading station 31 using an insertion device as for example described in U.S. Pat. No. 7,721,413. In accordance with a possible embodiment the preformed U-shaped conductors 25 are for example, and without for this reason introducing any limitation, made through an apparatus and a process as described in U.S. Pat. No. 7,480,987. Possible variants of the aforementioned apparatus are described in patent applications No. PCT/IT2010/000160 and No. PCT/IT2010/000187, not yet published at the filing date of the present application. Finally, in accordance with a non-limiting embodiment, the pockets of the twisting device 50 are made in accordance with the teachings of patent application No. PCT/IT2010/000174 not yet published at the filing date of the present application.

In accordance with an embodiment, the twisting device 50, 51 comprises clamping elements 61, 62 that are per sé known, and for this reason not described any further, able to be activated to independently clamp the first 51 and/or the second body 52 to an external reference, for example to the rotary table 36, to prevent it from rotating with respect to such a reference.

In accordance with an embodiment, the inner and outer bodies 51, 52 of the twisting device 50 comprise coupling seats 81, 82 suitable for interfacing with respective coupling pins 41, 42 provided in the containment head 40. Through such coupling pins 41, 42 it is possible to set in relative rotation the two bodies 51, 52. For example the coupling pins 41, 42 are fixedly connected, respectively, to two portions 43, 44 of the containment head 40 able to be set into relative rotation with respect to one another for example through a pair of servomotors, not shown in the figures.

In accordance with an embodiment, between the two bodies 51, 52 there is an intermediate cylinder 53 suitable for separating the pockets of the first array A1 from the pockets of the second array A2. Such a cylinder for example has a main body in the form of a relatively thin tubular wall 53.

The twisting device 50 comprises a system for clamping bar conductors comprising at least one sliding clamping element 72, 92 able to be moved in a radial direction with respect to the axial direction Zt-Zt, between an advanced operating position in which it has an end portion 75, 95 that projects inside an associated pocket and a set-back operating position. The advanced and set-back operating positions respectively correspond to an operative state clamping the conductor and to an operative state releasing the conductor. The set-back and advanced operating positions should be shown respectively in FIGS. 13 and 14, but since the stroke of the sliding element is relatively short for example equal to 1-3 mm, it is impossible with the scale of drawing to appreciate a difference in position of the sliding clamping element 72, 92 in such figures.

In accordance with an embodiment, like in the example represented in the figures, the clamping system comprises a plurality of sliding clamping elements 72, 92. It should be observed that in the particular example represented in the figures, the plurality of sliding clamping elements 72, 92 comprises at least one sliding clamping element 92 associated with a pocket of the first array A1 and at least one sliding clamping element 72 associated with a pocket of the second array A2.

In accordance with an embodiment, the plurality of sliding clamping elements 72, 92 comprises a first plurality 92 of sliding clamping elements associated with pockets of the first array A1 and a second plurality 72 of sliding clamping elements associated with pockets of the second array A2.

Figure 15:
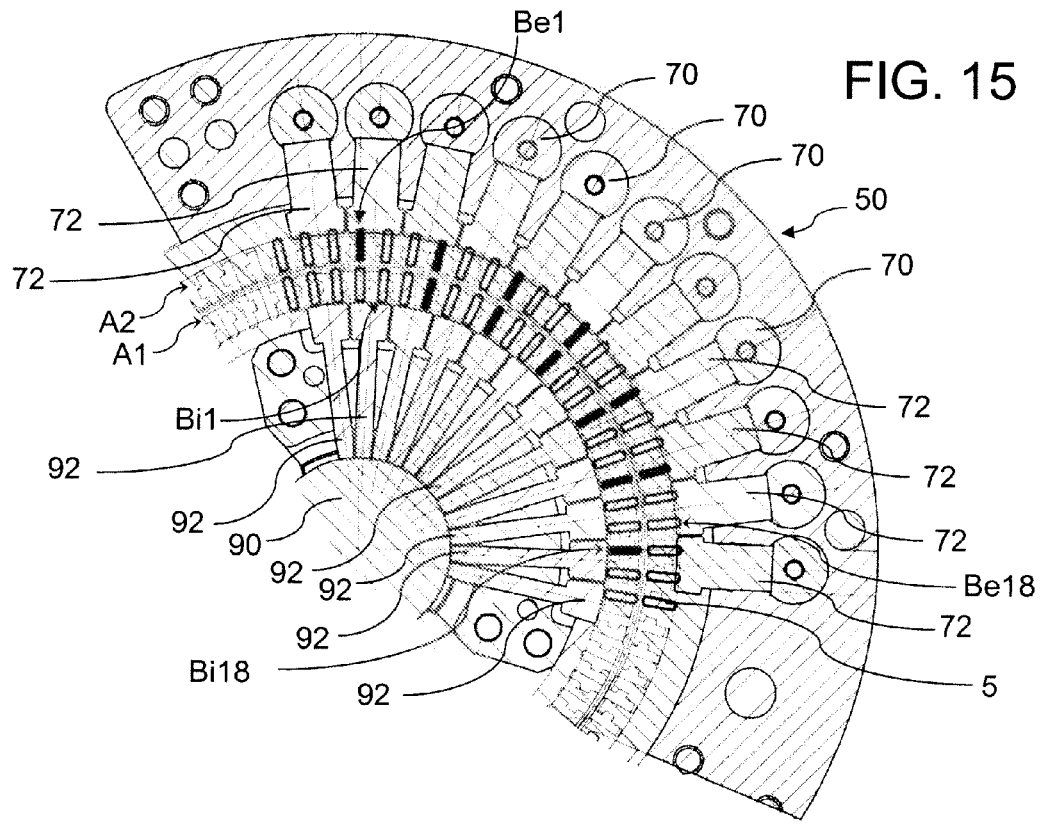
FIG. 15 shows a partial section view of the twisting device of FIG. 11.

In accordance with an embodiment, it is possible that the clamping system comprises a sliding clamping element associated with many pockets of the same array A1, A2. In this way, the same sliding clamping element 72, 92, when it takes up the advanced position, is able to simultaneously clamp many legs 5 of conductors. This embodiment, given as an example and not for limiting purposes, is represented in FIG. 15 in which it can be seen how each of the sliding clamping elements 72, 92 is suitable for cooperating with a pair of adjacent legs 5.

Figure 18:
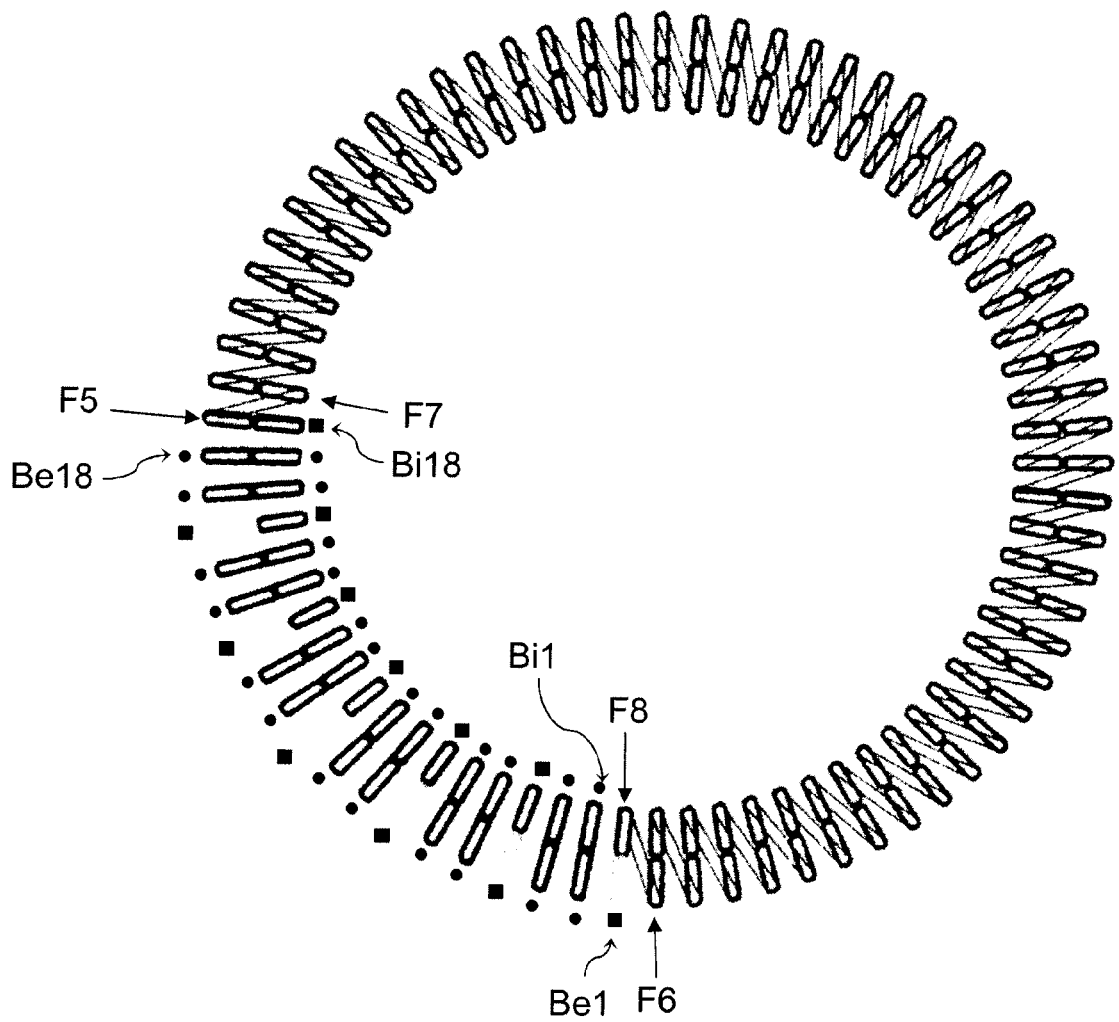
FIG. 18 shows a possible filling scheme of the twisting device of FIG. 11.

In accordance with an embodiment, the clamping system is such as to clamp all of the legs of the special bar conductors during a relative rotation of the two bodies 51, 52. For example, with reference to FIG. 18 an example scheme for loading the conductors inside the pockets of the twisting device 50 is shown, before subjecting the set of bar conductors to the twisting operation in the station 33.

As can be appreciated, the outer pockets (array A2) are loaded with legs 5 that form a first continuous arc of circumference (from the arrow F5 to the arrow F6 in the clockwise direction). The inner pockets (array A1) are also loaded with legs 5 that form a second continuous circular arc (from the arrow F7 to the arrow F8 in the clockwise direction). All of the pockets of the aforementioned first and second arc house legs 5 of preformed U-shaped conductors 25 that have been subjected in the example to pre-twisting of 5°, or more generally to a twisting by a predetermined first pitch. Such pre-twisting can, for example, be carried out in the insertion station 31 of the twisting apparatus 30. This pre-twisting, together with the subsequent twisting at the station 33 of all of the conductors inserted in the twisting device 50 makes it possible to obtain the basic conductors of the first and of the second type U1, U2 described above.

Again with reference to FIG. 18, the pockets marked with a square receive legs of special conductors S1, S2, S3. The remaining pockets, marked by a circle, house legs 5 of preformed U-shaped conductors 25 (which in the example represented are twelve in number) not subjected to any pre-twisting. With reference to FIG. 15, in the embodiment used as an example, the clamping system of the twisting device 50 is such as to clamp all of the legs of the special conductors S1, S2, S3, and therefore the legs marked in FIG. 19 with the square, and all of the legs 5 of the basic preformed U-shaped conductors and not subjected to any pre-twisting that belong:

to the arc of the inner array A1 comprised between the leg Bi1 and the leg Bi18 inclusive, starting from Bi1 and rotating clockwise; and to the arc of the outer array A2 comprised between the leg Be1 and the leg Be18 inclusive, starting from Be1 and rotating clockwise.

Again with reference to FIG. 15, it can be appreciated how the clamping system can be designed, without for this reason introducing any limitation, to clamp further legs of conductors not belonging to the arcs just defined above for example arranged adjacent to such arcs.

Figure 16:
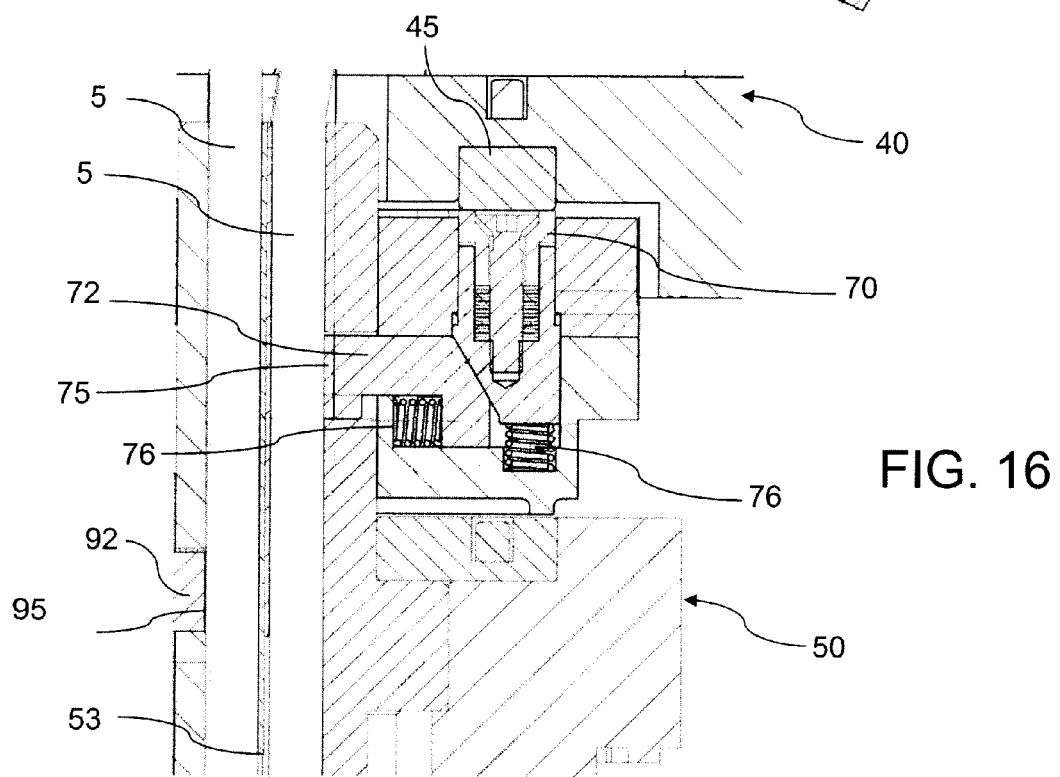
FIG. 16 shows an enlarged part of FIG. 13.
Figure 17:
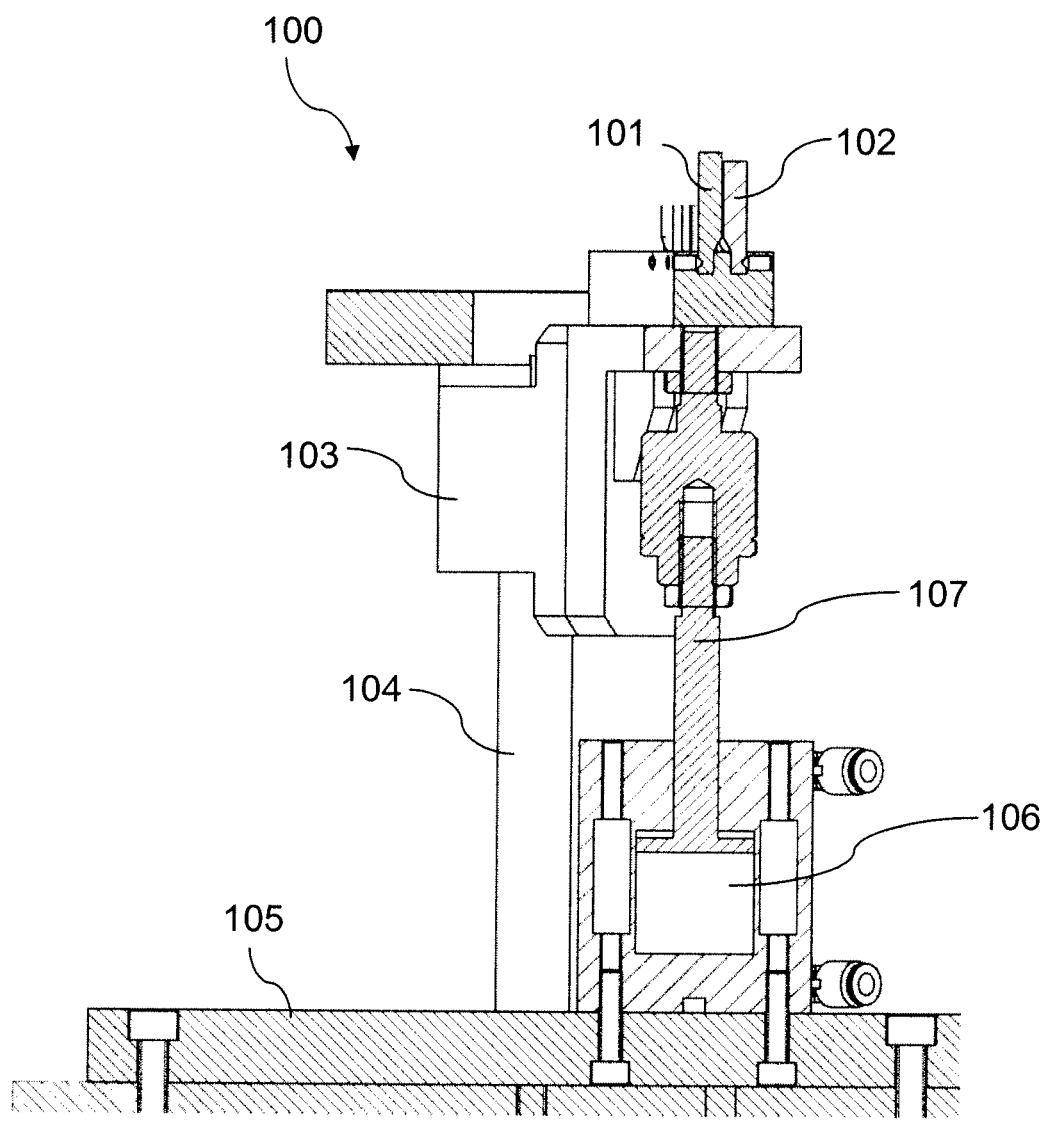
FIG. 17 shows a side section view of a further portion of the twisting apparatus of FIG. 10.

With reference to FIG. 16, it should be observed how the intermediate cylinder 53 represents an abutment wall of the pockets of the array A1 and A2 opposite the sliding clamping element 72, 92. The clamping system is suitable, in the operative state clamping the conductor, for clamping a leg 5 of the conductor between the abutment wall 53 and the sliding clamping element 72,92.

In accordance with an embodiment, the clamping system comprises at least one sliding thrusting member 70, 90 suitable for translating parallel to the twisting axis Zt-Zt and suitable for cooperating with the sliding clamping element 72, 92 to push it into the advanced position.

In the particular example described, the sliding thrusting member 70, 90 comprises at least one first sliding thrusting member 90 operatively associated with the inner body 51 and a second sliding thrusting member 70 operatively associated with the outer body 52.

Figure 13:
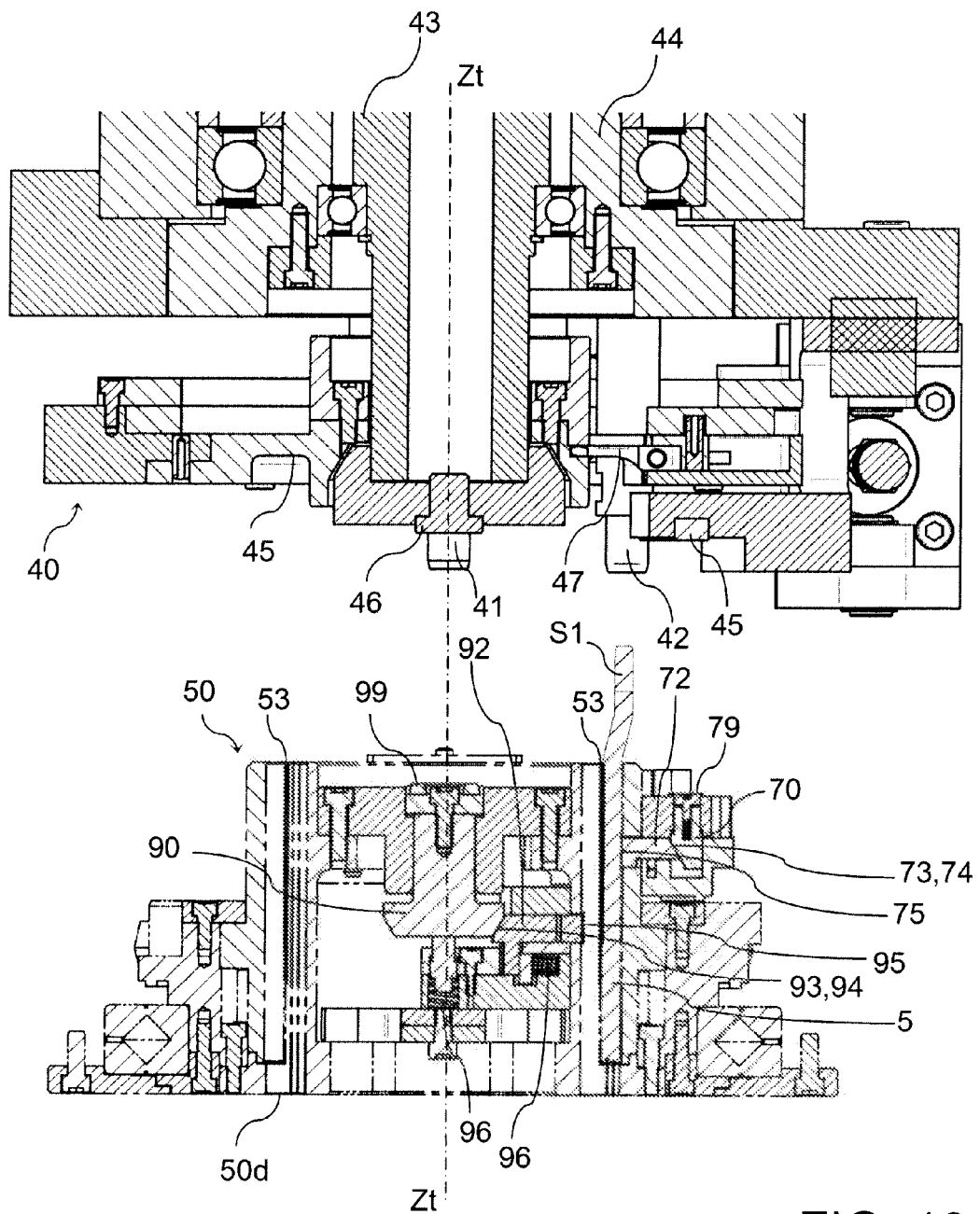
FIG. 13 shows a side section view of a portion of the twisting apparatus of FIG. 10 in which said portion is shown in a first operating configuration.

In accordance with a preferred and non-limiting embodiment, it is possible to that a sliding thrusting member 70, 90 cooperates with many sliding clamping elements 72, 92. For example, with reference to FIGS. 13-15, it should be observed that the sliding thrusting member 90 associated with the inner body 51 is operatively coupled with twelve sliding clamping elements 92. However, for each of the eleven sliding clamping elements 72 associated with the second body 52, a respective sliding thrusting member 70 is provided. The clamping system of the twisting device 50 comprises at least one elastic element 96, like for example one or more helical compression springs, suitable for keeping the sliding clamping element 72, 92 in the set-back position and the sliding thrusting member 70, 90 is such as to push the sliding clamping element 72, 92 into the advanced position in contrast to the action of the elastic element 96. With reference to FIG. 13, it can be seen how in the example represented two helical springs 96 are in particular provided, one of which is associated with the sliding clamping element 92 and the other with the sliding thrusting member 90. Clearly, with reference to FIG. 16, in a totally analogous way it is possible to associate elastic elements 76 with the sliding clamping element 72 and with the thrusting member 70 of the outer body 52.

In accordance with an embodiment, the sliding clamping element 72, 92 and the sliding thrusting member 70,90 are equipped with a first and a second interface wall 73,74 and 93,94 that interfere with one another in abutment, the interface walls being flat and inclined with respect to the axial direction Zt-Zt. Such walls are intended to slide on top of one another during a translation of the sliding thrusting member 70, 90 with the purpose of making the sliding clamping element 72, 92 advance. In accordance with an embodiment, such walls form an angle of about 30° with the twisting axis Zt-Zt.

Figure 14:
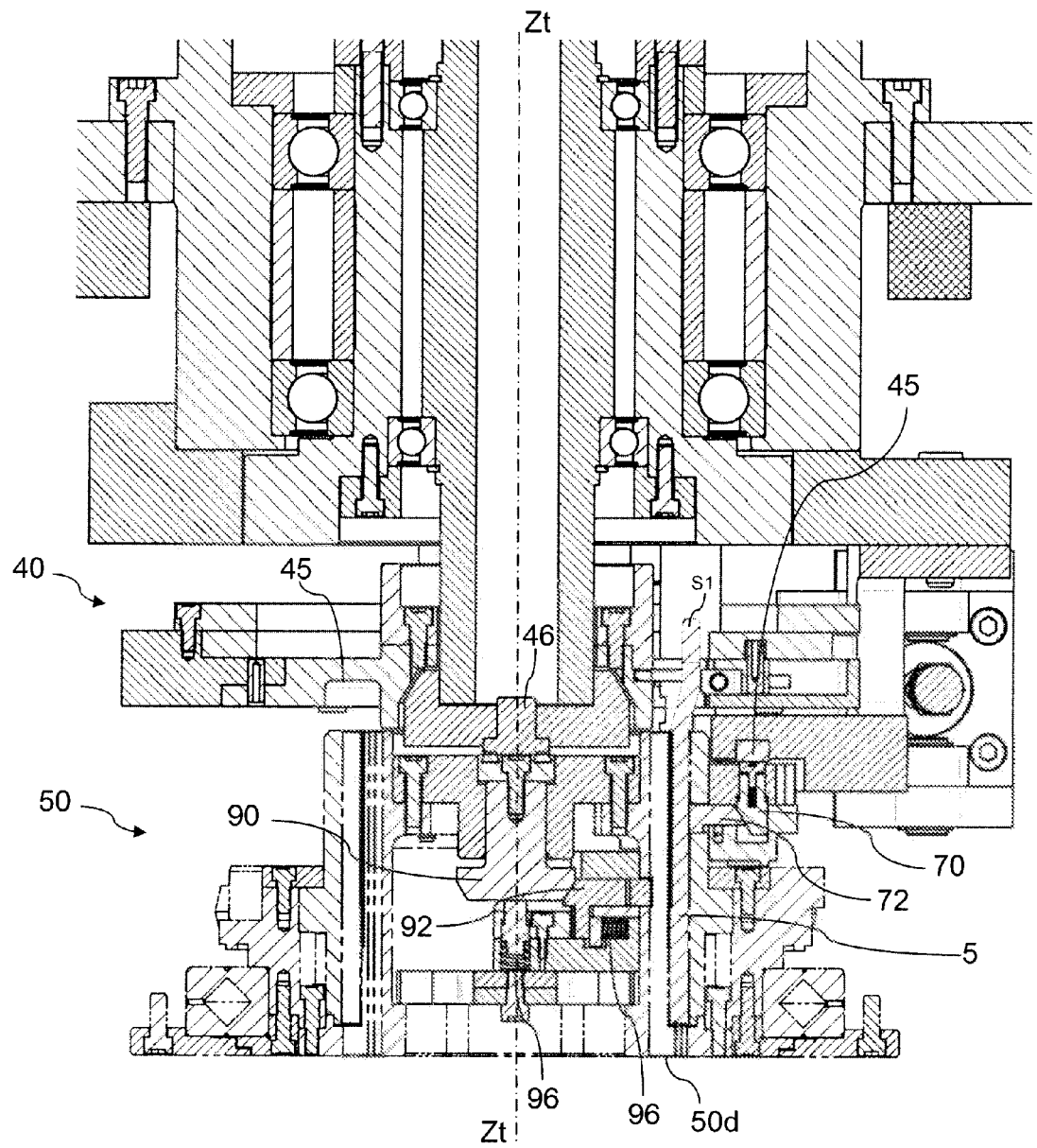
FIG. 14 shows a side section view of the portion of twisting apparatus represented in FIG. 13, in which said portion is shown in a second operating configuration.

With reference to FIGS. 13 and 14 in accordance with an embodiment, the twisting apparatus 30 comprises a containment head 40 suitable for being moved axially along the twisting axis Zt-Zt between a rest position (FIG. 13) and a work position (FIG. 14) to cooperate with the twisting device 50. Such a head comprises an abutment/containment surface 45 suitable for controlling the deformation of the basic conductors U1, U2 during the twisting operation. Such a head can possibly comprise radial grippers 47 for clamping the special conductors S1-S3.

In accordance with an embodiment, the head is such as to activate the clamping system of the twisting device 50 automatically and mechanically once the work position has been reached (FIG. 14).

In accordance with a particular embodiment, the containment head 40 is such as to interfere in abutment with the sliding thrusting member 70, 90 in passing from the rest position to the work position to move in translation the sliding thrusting member 70, 90 and therefore also the sliding clamping member 72, 92. For example, it is possible that an end portion 79, 99 of the thrusting members 70, 90 projects outside of the respective bodies 52, 51 to interfere in abutment, in the work position of the head 40, with respective projecting elements 48, 46 provided in it. For example, the end portion 79 is relatively rigid, whereas the projecting abutment element 48 is made from relatively elastic material, for example rubber. In accordance with an embodiment, the abutment element 48 is for example intended to cooperate with many sliding thrusting elements 70, 90, being shaped for example like an arch. With reference to FIG. 13, in accordance with an embodiment, the abutment element 46 is made from relatively rigid material whereas the projecting end portion 99, for example having a circular shape and trapezoidal section, is made from relatively elastic material, for example rubber.

In accordance with a further embodiment, the twisting apparatus 30 comprises a device 100 for adjusting the insertion height of selected conductors inside the pockets, the adjustment device 100 being suitable for adjusting the insertion height of selected conductors before the operative clamping state of such conductors is achieved through the clamping system described above.

The height adjustment device 100 represented comprises at least one pair of height reference blades 101, 102 that are radially aligned and suitable for being inserted into two radially aligned pockets of the first and of the second array A1, A2, respectively. In reality, it is theoretically possible for the device to have, instead of a pair of height reference blades 101, 102, a single height reference blade, for example to bring a preformed conductor with a single leg, like for example a terminal S1, to the correct height. Henceforth we shall however refer, without for this reason introducing any limitation, to the case in which at least one pair of height reference blades is provided.

The insertion of the height reference blades 101, 102 inside the respective pockets on the side of the lower face 50d of the twisting device 50 makes it possible to bring possible conductors to be clamped, that in the steps prior to the twisting operation, due to the clearance between the inner walls of the pockets and the outer walls of the legs 5, have undergone a lowering in height with respect to a desired insertion height, back to a predefined height through the clamping system.

The height adjustment device 100 comprises a slider 103 to which the height reference blades 101, 102 are fixed and comprises a guide column 104 of the slider 103. Such a guide column 104 is fixed to a support base 105. The height adjustment device 100 also comprises linear moving members suitable for controlling the sliding of the slider of the guide, like for example a pneumatic linear actuator 106 comprising a piston connected to the slider 103. The height adjustment device 100 makes it possible to bring those conductors, like for example those with a single leg like the phase terminals S1, for which it is particularly critical to maintain their position after insertion into the pocket, back into a correct position. Clearly, it can be provided for the height adjustment device 100 to have a number of pairs of height reference blades 101, 102 such as to bring all of the conductors having legs 5 intended to be clamped by the clamping system described above back to the desired height.

Hereafter an example of operation of a twisting apparatus 30 as described above will be described.

In FIG. 11 the twisting device 50 is represented in an operating insertion configuration. In such a configuration the twisting device 50 is positioned at the loading station 31. At such a station the loading of the basic conductors U1, U2 takes place. In particular it takes place first the loading of the preformed conductors of the first type U1, a pre-twisting of these by a predetermined pitch (for example equal to one pocket) and the subsequent loading of the preformed conductors of the second type U2. At the end of the loading the pockets intended to house the legs 5 of the special conductors S1-S3 are left free.

At the end of the loading step of the basic conductors U1, U2 described above, the rotary table 36 is set in rotation in the clockwise direction to bring the twisting device into the loading station 32 of the special conductors S1-S3. In such a station for example the loading is carried out manually by an operator.

After the loading of the special conductors S1-S3, the rotary table 36 is set in rotation in the clockwise direction to bring the twisting device 50 into the twisting station 33. If provided, the height adjustment device 100 is actuated making the height reference blades 101, 102 advance towards the twisting device 50. Keeping the blades in position, the containment head 40 is moved in translation towards the twisting device 50 until, by interference in abutment of the containment head 40 with the sliding thrusting members 70, 90, the operative clamping state of the conductors is achieved. Once such a state has been reached, the height reference blades 101, 102 are pulled back with respect to the twisting device 50. Thereafter, the two bodies 51, 52 are rotated by a predetermined amount, i.e. the actual twisting operation of the head portions is carried out. Thereafter, the rotary table 36 is set in rotation in the clockwise direction to bring the twisting device 50 into the station 34 for extracting the conductors and inserting them into a stator core 2.

Figure 19:
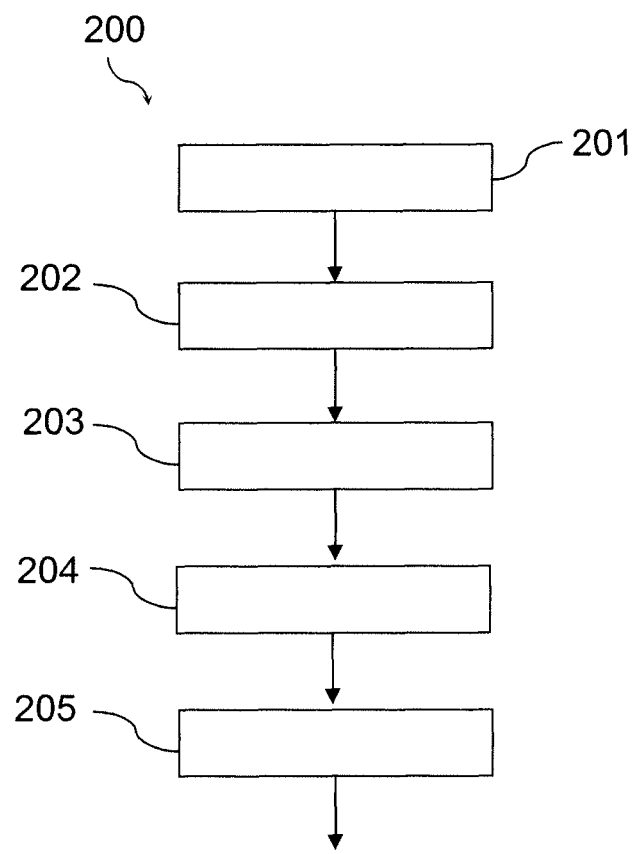
FIG. 19 shows a block diagram of a twisting process.

With reference to FIG. 19, based on the operation illustrated above of the twisting apparatus and also based on the description given of the twisting apparatus, it can be seen that a twisting method 200 of preformed conductors for bar windings of electric machines has in practice been described, the method 200 comprising the steps of:

a) providing 201 a twisting apparatus 30 comprising a twisting device 50 having at least a first 51 and a second 52 body coaxial to one another and extending around a twisting axis Zt-Zt and respectively comprising a first and a second circular array A1, A2 of pockets with centre on such an axis;

b) providing 202 a plurality of preformed bar conductors having at least one leg 5 and inserting the legs of said plurality of conductors into respective pockets;

c) clamping 204 at least one of said legs inside a respective pocket by actuating a respective clamping element suitable for interfering in abutment with a wall portion of said leg inside such a pocket;

d) setting in relative rotation 205 the first and the second body.

In accordance with an embodiment, the method 200, comprises, before the clamping step 204, a step 204 of adjusting the insertion height of said at least one conductor for insertion inside the pocket and from the opposite side of said device with respect to a loading side, of a height reference blade 101, 102.

As can be appreciated from what has been described the twisting apparatus described above allows the requirements described above with reference to the prior art to be satisfied.

Indeed, it should be observed that the aforementioned apparatus 30 makes it possible to stabilise the position of selected conductors with respect to the twisting device 50 and to obtain a precise twisting and bar windings having conductors having a relatively precise shape.

A man skilled in the art, in order to satisfy contingent and specific requirements, can bring numerous modifications and variants to the apparatus and to the method described above, all of which are moreover covered by the invention as defined by the following claims.

The invention claimed is:

1. Apparatus for twisting preformed bar conductors for bar windings of electric machines, each of said conductors comprising one or more legs, the twisting apparatus comprising a twisting device having at least a first and a second body coaxial to one another and extending around a twisting axis defining an axial direction and comprising respectively a first and second circular array of pockets with centre on said twisting axis, the pockets being suitable for receiving legs of said preformed bar conductors, said bodies being able to rotate relative to one another around the twisting axis, characterised in that the twisting device comprises a system for clamping bar conductors comprising at least one sliding clamping element able to be moved in a radial direction with respect to said axial direction to take up an advanced operating position in which it has an end portion that projects inside an associated pocket and a set-back operating position, the advanced and set-back operating positions corresponding, respectively, to an operative state clamping the conductor and an operative state releasing the conductor.

2. Twisting apparatus according to claim 1, wherein the clamping system comprises a plurality of said sliding clamping elements.

3. Twisting apparatus according to claim 2, wherein the plurality of sliding clamping elements comprises at least one clamping element associated with a pocket of the first array and at least one clamping element associated with a pocket of the second array.

4. Twisting apparatus according to claim 1, wherein the preformed bar conductors comprise a set of basic conductors and a set of special conductors to complete the winding, and wherein the sliding clamping elements are suitable for cooperating with the set of special conductors to clamp them during a relative rotation between the first and second body.

5. Twisting apparatus according to claim 1, wherein said associated pocket comprises an abutment wall opposite the sliding clamping element and wherein the clamping system is suitable, in the operative state clamping the conductor, for clamping said leg between the abutment wall and the sliding clamping element.

6. Twisting apparatus according to claim 1, wherein the twisting device comprises at least one sliding thrusting member able to slide parallel to said axial direction and suitable for cooperating with the sliding clamping element to push it into said advanced position.

7. Twisting apparatus according to claim 6, wherein the sliding thrusting member comprises at least one first sliding thrusting member operatively associated with the first body and a second sliding thrusting member associated with the second body.

8. Twisting apparatus according to claim 6, wherein the clamping system comprises at least one elastic element suitable for keeping the sliding clamping element in the set-back position and wherein the sliding thrusting member is such as to push the sliding clamping element into the advanced position in contrast to the action of said elastic element.

9. Twisting apparatus according to claim 7, wherein the sliding clamping element and the sliding thrusting member are respectively equipped with a first and a second interface wall that interfere with one another in abutment, said interface walls being flat and inclined with respect to said twisting axis.

10. Twisting apparatus according to claim 1, wherein the apparatus comprises a containment head suitable for being moved in said axial direction between a rest position and a work position to cooperate with the twisting device and said bar conductors, said head being such as to activate the clamping system automatically and mechanically once the work position has been reached.

11. Twisting apparatus according to claim 6, wherein the containment head is such as to interfere in abutment with the sliding thrusting member in passing from the rest position to the work position to move the sliding thrusting member in translation.

12. Twisting apparatus according to claim 1, comprising a device for adjusting the insertion height of said conductor inside said pocket, the adjustment device being suitable for adjusting the insertion height of said conductor before the operative state clamping the conductor is achieved.

13. Method for twisting preformed conductors for bar windings of electric machines, the method comprising the steps of:
  a) providing a twisting apparatus comprising a twisting device having at least a first and a second body coaxial to one another and extending around a twisting axis defining an axial direction and respectively comprising a first and a second circular array of pockets with centre on said twisting axis;
  b) providing a plurality of preformed bar conductors having at least one leg and inserting the legs of said plurality of conductors into respective pockets;
  c) clamping at least one of said legs inside a respective pocket by actuating a respective sliding clamping element suitable for interfering in abutment with a wall portion of said leg inside such a pocket, said clamping step comprising moving said respective sliding clamping element in a radial direction with respect to said axial direction;
  d) setting in relative rotation the first and the second body.

14. Twisting method according to claim 13, comprising before the clamping step, a step of adjusting the insertion height of said at least one conductor for insertion inside the pocket and on the opposite side of said device with respect to a loading side, of a height reference blade.

* * * * *